Dec. 22, 1942.   W. K. MILLHOLLAND   2,305,728
TOOL HOLDER FOR LATHES
Filed Aug. 4, 1941   2 Sheets-Sheet 1

INVENTOR.
WILLIAM K. MILLHOLLAND,
BY Hood & Hahn
ATTORNEYS.

Dec. 22, 1942.        W. K. MILLHOLLAND        2,305,728
TOOL HOLDER FOR LATHES
Filed Aug. 4, 1941        2 Sheets-Sheet 2

INVENTOR.
WILLIAM K. MILLHOLLAND,
BY Hood & Hahn.
ATTORNEYS.

Patented Dec. 22, 1942

2,305,728

UNITED STATES PATENT OFFICE 2,305,728

TOOL HOLDER FOR LATHES

William K. Millholland, Indianapolis, Ind.

Application August 4, 1941, Serial No. 405,352

6 Claims. (Cl. 29—49)

The object of my invention is to provide a simple and accurately effective multiple tool holder for lathes, of such character that the various tools carried thereby may be rapidly and accurately positioned and their carrying head firmly clamped, by a hand manipulation lacking in accuracy.

The accompanying drawings illustrate my invention.

Figure 1:
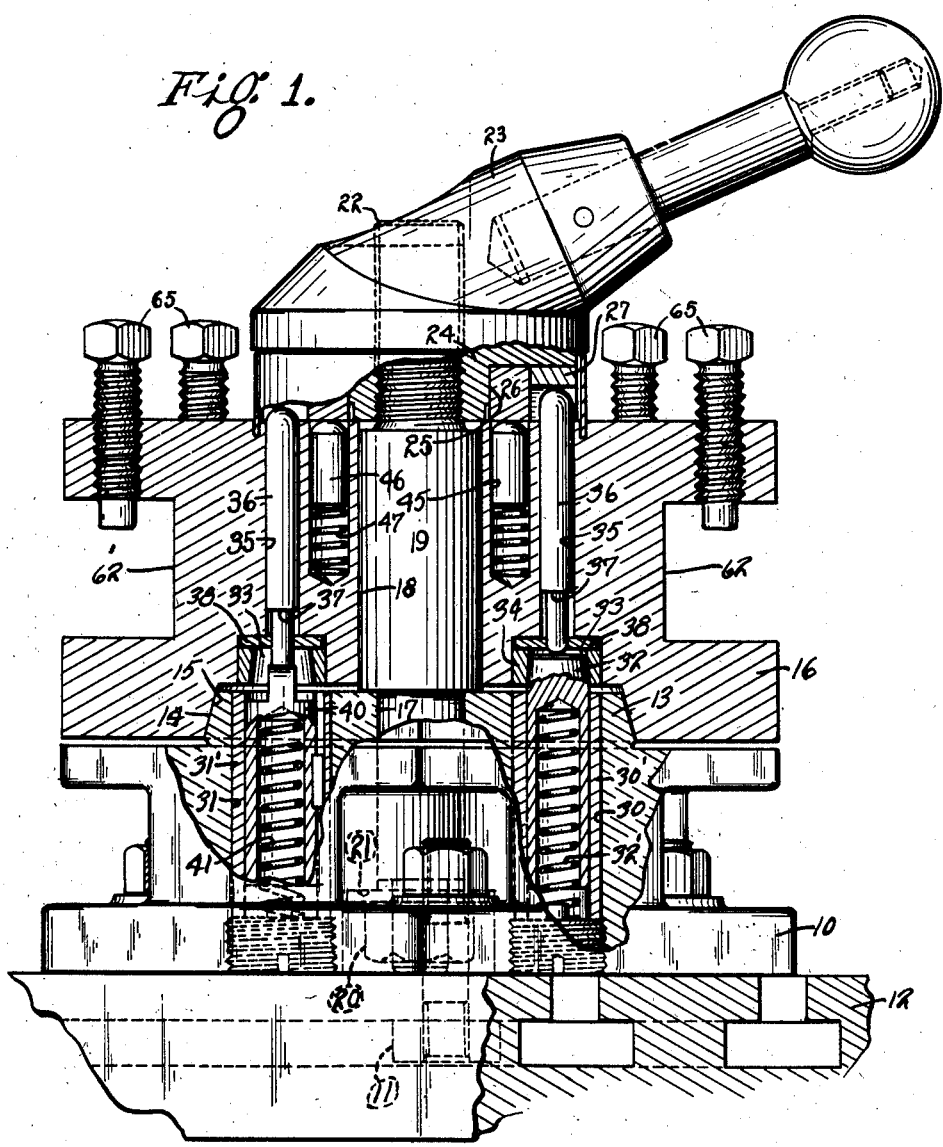
Figures 2, 3:
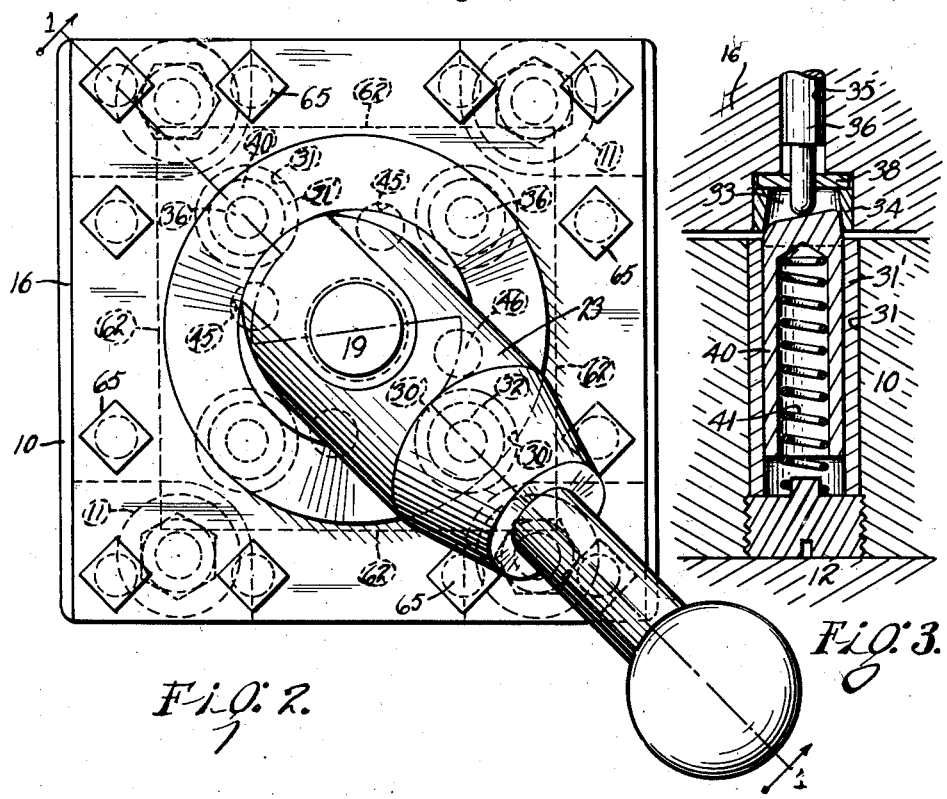
Figure 4:
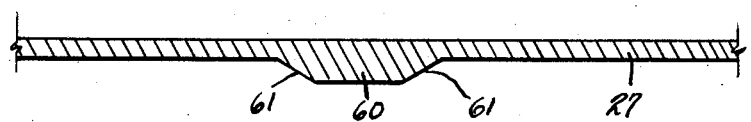

Fig. 1 is a side elevation in partial section of an embodiment of my invention;

Fig. 2 a plan;

Fig. 3 a fragmentary developed section axially of the preliminary indexing pin;

Fig. 4 a development of the releasing cam; and

Figure 5:
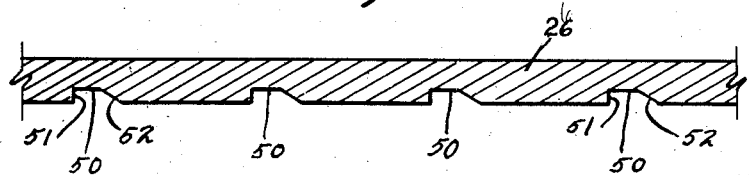

Fig. 5 a development of the forwarding cam.

In the drawings 10 indicates the base of my tool holder, mounted by usual clamping means 11 upon the tool carriage 12 of a lathe. Base 10 is provided at its upper end with a turn-table 13 having an accurately machined coned circumferential face 14 upon which is accurately fitted a pocket 15 formed in the under face of the rotary tool holder 16. Base 10 is axially bored at 17 and holder 16 is axially bored at 18 and projecting through these bores is a clamp stem or post 19 provided at its lower end with a head or nut 20 which abuts upwardly against a downwardly presented shoulder 21 of base 10 and at its upper end is threaded at 22 to receive the operating arm 23 threaded thereon.

Part 24 of arm 23 is circumferentially rabbeted at 25 to form a seat for the circular cam rings 26 and 27. Ring 26 is press-fitted into the rabbet, or otherwise secured against circumferential shifting relative to the arm 23. Cam 27 is sleeved over arm 26 and held against relative rotation by a press-fit or otherwise.

Base 10 is perforated, parallel with its bore 17 and conveniently at diametrically opposite points, by perforations 30 and 31 in which are mounted hardened machined bushings 30' and 31' respectively. Reciprocably mounted in bushing 30' is an indexing pin 32 normally urged upwardly by spring 32'. This pin 32 is slightly tapered at its upper end so as to accurately fit into any one of a series of tapered indexing holes or pockets 33 corresponding in number and position of the tools to be carried by holder 16 and conveniently formed in a hardened ring 34 firmly seated in holder 16.

Axially aligned with each indexing pocket 33 in a bore 35 through holder 16 is a release pin 36 the upper end of which cooperates with cam ring 27.

Splined in bushing 31' is the preliminary-indexing pin 40 normally urged upwardly by a spring 41. The upper end of pin 40 is so formed as to project into any one of pockets 33 (or special pockets if so desired) in ring 34 and formed as shown in Fig. 3 at one side so as to slightly obstruct, but yet permit, advancing rotation of the holder 16 in one direction and so as to prevent retrograde movement of the holder 16.

Holder 16 is provided with as many pockets 45 as there are tool places and in each is mounted a vertically slidable latch pin 46 normally urged upwardly by spring 47 into association with the cam ring 26. Cam ring 26 is provided on its under face with a plurality of pockets 50, corresponding in number with the number of tools to be held by holder 16, adapted to be entered by the latch pins 46. Each of these pockets on its trailing side presents a square shoulder 51 which will engage a pin 46 so as to propel holder 16 to an advanced position, and at its advance side is provided with a cammed surface 52 which will act upon pin 46 to depress it so as to permit return movement of the arm 23 to its normal and clamping position.

The cam ring 27 is provided with a cam lug 60 by which the release pins 36 may be successively engaged, and the leading and trailing ends of this lug are inclined, as indicated at 61, so as to coact with the projected pin 36 to drive it down against pin 32 to retract it from locking interengagement with the tool head 16.

Rings 26 and 27 are, of course, normally fixed non-rotatively relative to arm 23 and ring 34 is firmly seated in the tool head 16 and moves therewith. Tool head 16 is provided with a plurality of tool-receiving pockets 62 corresponding in number with the pockets 33, suitable tool fastening means 65 being provided to hold the tools in desired position relative to holder 16.

The lower end of each pin 36 is ensmalled so as to present a downwardly presented shoulder 37 and the ensmalled end projects through a retainer ring 38 surmounting ring 34, the part being so proportioned that when shoulder 37 rests on ring 38 the upper end of pin 36 will be free from cam 27.

Each pin 36, as it arrives over pin 40, rests on the upper end thereof and consequently is projected upwardly to an intermediate position. When a tool is in operative position, pin 32 projects into one of pockets 33 and pin 40 projects into another pocket 33.

In order to shift a new tool into position, the operator swings arm 23 to first bring cam portion 61 into engagement with the adjacent pin 36 so as to depress it and push plunger 32 out of interlocking engagement with head 16. At this moment pockets 50 are brought into registry with pins 46 which snap into the pockets and permit shoulders 51 thereof to engage pins 46 so that further advance of arm 23 rotates head 16. At the beginning of this movement of head 16 ring 34 pushes splined plunger 40 out of pocket 33 into which it extends. Movement of arm 23 is continued until pins 40 and 32 snap into new pockets 33. Lever 23 is thereupon reversed, the threads or posts 19 serving to draw the lever solidly down upon holder 16 and seat it firmly and accurately onto the table 10 because of the conification at 14—15 and the conification of pin 32 and pockets 33.

I claim as my invention:

1. A tool-post comprising a main body having a coned upper end and carrying a post threaded at its upper end, a tool holder having a coned lower end cooperative with the coned end of the main body and rotatively mounted on said body around said post and provided with a plurality of circumferentially spaced indexing pockets, a plurality of release pins slidably mounted in said holder, one aligned with each pocket, a spring-urged latch pin mounted in the holder and projectible thereabove, an operating arm threaded on the threaded post and engageable with the holder axially thereof, cam elements carried by the arm and engageable with the latch pin and release pins, a spring-urged indexing pin mounted in the main body and projectible into successively-presented indexing pockets of the holder and engageable by said release pins, and a preliminary spring-urged indexing pin mounted in the main body and projectible into successively-presented indexing pockets of the holder.

2. A tool-post comprising a main body carrying a post threaded at its upper end, a tool holder rotatively mounted on said body around said post and provided with a plurality of circumferentially spaced indexing pockets, a plurality of release pins slidably mounted in said holder, one aligned with each pocket, a spring-urged latch pin mounted in the holder and projectible thereabove, an operating arm threaded on the threaded post and engageable with the latch pin and release pins axially thereof, a spring-urged indexing pin mounted in the main body and projectible into successively-presented indexing pockets of the holder and engageable by said release pins, and a preliminary spring-urged indexing pin mounted in the main body and projectible into successively-presented indexing pockets of the holder.

3. A tool-post comprising a main body having a coned upper end and carrying a post threaded at its upper end, a tool holder having a coned lower end cooperative with the coned end of the main body and rotatively mounted on said body around said post and provided with a plurality of circumferentially spaced indexing pockets, a plurality of release pins slidably mounted in said holder, one aligned with each pocket, a spring-urged latch pin mounted in the holder and projectible thereabove, an operating arm threaded on the threaded post and engageable with the holder axially thereof, cam elements carried by the arm and engageable with the latch pin and release pins, a spring-urged indexing pin mounted in the main body and projectible into successively-presented indexing pockets of the holder and engageable by said release pins, and a preliminary spring-urged indexing pin mounted in the main body and projectible into successively-presented indexing pockets of the holder, the upper end of said last-mentioned pin being so formed that said pin may be forced out of any pocket into which it projects by sufficient rotative force applied to the tool holder.

4. A tool-post comprising a main body carrying a post threaded at its upper end, a tool holder rotatively mounted on said body around said post and provided with a plurality of circumferentially spaced indexing pockets, a plurality of release pins slidably mounted in said holder, one aligned with each pocket, a spring-urged latch pin mounted in the holder and projectible thereabove, an operating arm threaded on the threaded post and engageable with the latch pin and release pins axially thereof, a spring-urged indexing pin mounted in the main body and projectible into successively-presented indexing pockets of the holder and engageable by said release pins, and a preliminary spring-urged indexing pin mounted in the main body and projectible into successively-presented indexing pockets of the holder, the upper end of said last-mentioned pin being so formed that said pin may be forced out of any pocket into which it projects by sufficient rotative force applied to the tool holder.

5. A tool-post comprising a main body, a tool holder journalled on the main body and contactible with the upper end of the main body, an operating arm threaded on the main body and engageable with the tool holder to clamp it on the main body, indexing means between the main body and tool holder to position said holder, one-way actuating means between the arm and holder by which movement of the arm in one direction may advance the holder on the main body, means interposed between the arm and indexing means by which movement of the arm independently of the holder will render the indexing means temporarily ineffective, and preliminary-indexing means effective to obstruct advancing movement of the holder in a position to receive the first-mentioned indexing means.

6. A tool-post comprising a main body having a coned upper end, a tool holder journalled on the main body and having a coned pocket contactible with the coned upper end of the main body, an operating arm threaded on the main body and engageable with the tool holder to clamp it on the main body, indexing means between the main body and tool holder to position said holder, one-way actuating means between the arm and holder by which movement of the arm in one direction may advance the holder on the main body, means interposed between the arm and indexing means by which movement of the arm independently of the holder will render the indexing means temporarily ineffective, and preliminary-indexing means effective to obstruct advancing movement of the holder in a position to receive the first-mentioned indexing means.

WILLIAM K. MILLHOLLAND.